United States Patent [19]

Kohler

[11] Patent Number: 4,471,529
[45] Date of Patent: Sep. 18, 1984

[54] MEASURING HEAD FOR MEASURING EQUIPMENT, MULTI-COORDINATE MEASURING INSTRUMENTS, AND MACHINE TOOLS

[75] Inventor: Paul Kohler, Oberndorf, Fed. Rep. of Germany

[73] Assignee: Mauser-Werke Oberndorf GmbH, Fed. Rep. of Germany

[21] Appl. No.: 412,989

[22] Filed: Aug. 30, 1982

[30] Foreign Application Priority Data

Sep. 8, 1981 [DE] Fed. Rep. of Germany ....... 3135495

[51] Int. Cl.³ .............................................. G01B 7/02
[52] U.S. Cl. ................................................... 33/174 L
[58] Field of Search .............. 33/169 R, 172 E, 174 L

[56] References Cited

U.S. PATENT DOCUMENTS

| | | | |
|---|---|---|---|
| 3,869,799 | 3/1975 | Neuer et al. | 33/174 L |
| 3,888,012 | 6/1975 | Droz | 33/174 L |
| 3,945,124 | 3/1976 | Jacoby et al. | 33/174 L |
| 3,990,153 | 11/1976 | Calame | 33/174 L |
| 4,078,314 | 3/1978 | McMurtry | 33/174 L |
| 4,130,941 | 12/1978 | Amsbury | 33/174 L |
| 4,254,554 | 3/1981 | Germano et al. | 33/174 L |

Primary Examiner—Richard R. Stearns
Attorney, Agent, or Firm—McGlew and Tuttle

[57] ABSTRACT

A measuring head for measuring article contour positions comprises a casing with a feeler pin mounted in the casing for pivotal movement in three-dimensional directions. A separate spring biases the feeler element in a neutral position in each of the three dimensional movement directions and the feeler pin is movable against the bias in all directions in a measuring movement. The measuring head is provided for measuring equipment for multi-coordinate measuring instruments and machine tools and is provided with connections for a digital or an analog evaluation of the measured value. Preferably a plurality or rope elements are connected to the feeler pin to hold it in its coordinate zero position within the casing and to extend in the respective X, Y and Z directions and are in equilibrium with each other in their state of rest. The biasing means in the form of springs are arranged in parallel to each of the rope elements an exert a force in the direction of a coordinate zero position acting opposite to the measuring motions of the feeler pin.

17 Claims, 3 Drawing Figures

MEASURING HEAD FOR MEASURING EQUIPMENT, MULTI-COORDINATE MEASURING INSTRUMENTS, AND MACHINE TOOLS

FIELD AND BACKGROUND OF THE INVENTION

This invention relates in general to measuring devices and in particular to a new and useful measuring head which includes a feeler pin mounted in a casing for movement in three-dimensional directions relative to a stationary frame structure.

There are known measuring heads comprising a feeler pin which is three-dimensionally movable relative to a fixed frame construction and, by moving into measuring contact, is displaced in accordance with the design of the parallelogram structure of the measuring head. Such a construction which permits a parallel displacement of the feeler pin in all directions of the X, Y, Z coordinate system is desirable, yet also expensive and requires space which is frequently not available. In one prior art design, the measuring head comprises a system of plates which are superposed in spaced relationship and in which leaf springs are attached between the lowermost two plates, for deflection in the X direction and between the superjacent next two plates, for deflection in the Y direction. Thereabove, space two plates have angled lateral wall extensions between which leaf springs deflecting in the Z direction are inserted. Within the arrangement of plates, a measuring system for evaluating the measurement, and elements for returning the feeler pin into its coordinate zero position, are provided. Even though this system, due to the parallelogram, construction, advantageously ensures a substantially parallel displacement of the feeler pin at the measuring contact with the workpiece, the arrangement is too expensive and the space this sandwich structure requires in the vertical direction is excessive.

A measuring head of different design is disclosed in German AS No. 38 04 398. In this measuring head, intended for a coordinate measuring machine, the feeler pin is mounted in a casing, by means of a bearing system of balls, for tilting in any direction and for being vertically removed. The tilting of the feeler pin relative to its bearing structure is effected against the action of a spring by which the pin is returned into its initial position after each deflection.

SUMMARY OF THE INVENTION

The present invention is directed to a measuring head permitting the displacement of the feeler three-dimensionally, while, at the same time, ensuring that after the effected measuring operation, the feeler will be returned exactly to its initial coordinate zero position, and being of a construction requiring few means and little space.

In accordance with the invention there is provided a measuring head for measuring equipment which comprises a casing with a feeler pin mounted in the casing for movement in three-dimensional directions of X, Y and Z coordinates and against the action of a spring. The feeler pin is provided with connections for digital or analog evaluation of the measured value and a plurality of rope elements are connected to the feeler pin and hold it in its coordinate zero position within the casing. Rope elements extend in respective X, Y and Z directions and are in equilibrium with each other in their state of rest. A spring is associated with and arranged parallel to each of the rope elements and exerts its force in the direction of the coordinate position and acts in a direction opposite to that of the measuring motions of the feeler pin.

Such a measuring head requires a minimum space since the feeler pin is held in its fixed coordinate zero position by ropes which are in mutual equilibrium and can extend in close proximity to each other and occupy a very small space. Fixing in the zero position is obtained by springs which extend parallel to the ropes and ensure a quick and exact return of the feeler pin into its initial position, particularly after a displacement thereof into measuring contact. To ensure a substantially linear displacement of the feeler pin during this motion into measuring contact, a development of the invention provides that the feeler pin is held in its coordinate zero positions within the casing by ropes or bands which, in all three directions, i.e. the X, Y and Z directions, extend in parallel and are spaced from each other. Springs acting in directions opposite to those in which the feeler pin moves, to return the pin into its coordinate zero position quickly and accurately, are then associated with each of the ropes extending in the X, Y and Z directions.

Advantageously, the feeler pin is firmly connected to a feeler carrier which is movable in all directions of motion of the X, Y and Z system. The carrier is connected in the X and Y directions to a median casing through rope elements which are arranged in spaced parallel relationship one above the other. The median casing is also connected through ropes extending in the X and Y directions and in spaced parallel relationship one above the other to the casing. Feeler carriers connected by a rope extending in the Z direction which is fixed relative to an intermediate plate which in turn by means of a second rope extending in the Z direction, is connected to the bottom wall of the casing. Each of the ropes is associated with a spring acting in a direction opposite to that of the measuring motion of the feeler pin.

Accordingly, it is an object of the invention to provide a measuring head for measuring article contour positions which comprises a casing with a feeler pin bounded in the casing for pivotal movement in three-dimensions and having a connection for a digital or analog evaluation of a measured value in response to the movement which includes a separate spring biasing the feeler element in a neutral position and acting in each of the three-dimensional movement directions and wherein the feeler pin is movable against the biasing in all directions in a measuring movement.

A further object of the invention is to provide a measuring head for measuring equipment which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the the accompanying drawings and descriptive matter in which a preferred embodiment of the invention is illustrated.

BRIEF DESCRIPTION O THE DRAWINGS

DESCRIPTION OF THE PREFERRED EMBODIMENT

Figure 1:
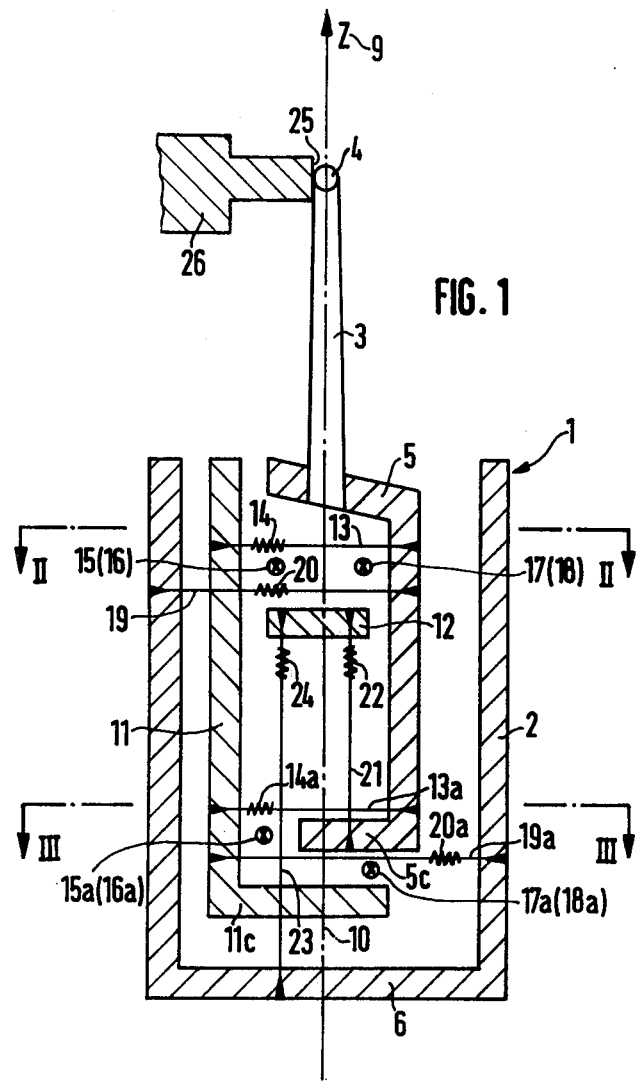
FIG. 1 is a diagrammatical longitudinal sectional view of the inventive measuring head.
Figure 2:
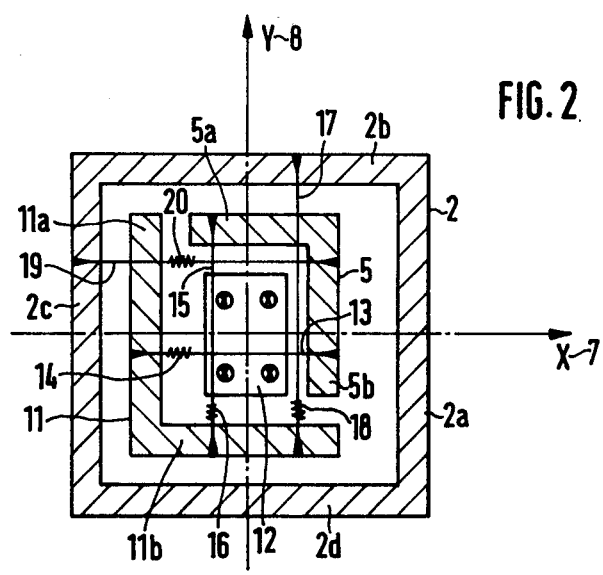
FIG. 2 is a sectional view taken along the line II—II of FIG. 1.

Referring to the drawings in particular, the invention embodied therein, comprises a measuring head generally designated 1, for measuring the contour of an article such as a workpiece 26. The measuring head includes a feeler head 4 which is applied against a surface 25 of the workpiece to be measured. A feeler pin 3 carries the feeler head 4 with an electrical connection (not shown) to an evaluator for a digital or an analog evaluation of the measured value produced by the motion of the head 4. Feeler pin 3 is connected to a feeler carrier which is mounted in a casing 2 for pivotal movement in three-dimensional directions and a separate spring biases the feeler element into a neutral position and is provided for each of the three-dimensional movement directions. Feeler pin 3 is movable against the biasing in all directions in a measuring movement.

The measuring head 1 substantially comprises the casing 2 and the feeler pin 3 which is three-dimensionally movable relative to stationary casing 2 and equipped with the spherical feeler head 4. By its base, feeler pin 3 is firmly secured to a feeler carrier 5 which extends within casing 2 down to the vicinity of the bottom wall 6 of the casing. Carrier 5 is an angle member with legs 5a, 5b extending at right angles to each other in the X and Y directions, respectively.

In the Z direction 9, feeler carrier 5 extends parallel to the longitudinal axis 10 of the casing. Opposite to feeler carrier 5, a median casing 11 is provided which also has the shape of an angle member having two legs 11a, 11b and extending in the Z direction 9. Below, feeler carrier 5 is provided with a bottom plate 5c and median casing 11 with a bottom plate 11c, both these plates extending parallel to the bottom wall 6 of casing 2. In the upper zone of casing 2, in the space between the opposite surfaces of feeler carrier 5 and median casing 11, an intermediate plate 12 is provided extending perpendicularly to longitudinal axis 10 of casing 2. Feeler carrier 5, median casing 11, intermediate plate 12, and casing 2 are connected to each other and held in equilibrium by ropes which are formed each by a plurality of steel strands, in such a manner that in its position or rest, feeler pin 3 occupies its coordinate zero position. In the upper zone of casing 2, a rope 13 extends from leg 5b of feeler carrier 5 to leg 11a of median casing 11 in the X direction 7. This rope 13 is firmly attached to legs 5b and 11a. Parallel to rope 13, a tension spring 14 is inserted. An identical connection is provided between leg 5a of feeler carrier 5 and leg 11b of the median casing 11. Namely through a rope 15 and a parallel tension spring 16 both extending in the Y direction 8. Vertically spaced from these ropes 13 and 15, a second rope construction parallel thereto is provided comprising ropes 13a and tension springs 14a in the X direction, and rope 15a and tension spring 16a in the Y direction.

Figure 3:
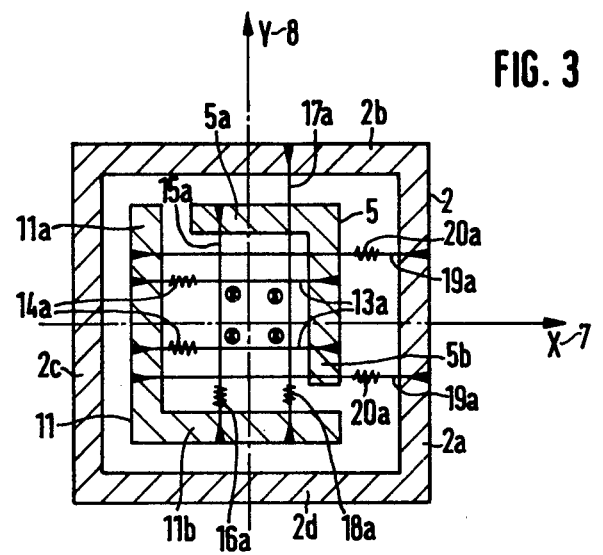
FIG. 3 is a sectional view taken along the line III—III of FIG. 1.

Median casing 11 is further connected to casing 2, through another rope construction. In the upper zone of casing 2, a rope 17 extends between leg 11b and casing wall 2b. Again a tension spring 18 is inserted extending parallel to this rope. In addition to this attachment of median casing 11 in the Y direction 8, a second attachment of feeler carrier 5 is provided in the X direction 7. This is effected by rope 19 and a parallel tension spring 20 between leg 5b and wall 2c, in the upper zone of casing 2. In the lower zone of the casing a rope construction comprising a rope 17a and a tension spring 18a is provided between leg 11b of median casing 11 and wall 2b. Another rope connection is provided in the lower zone of casing 2, namely ropes 19a with parallel tension springs 20a, extending between leg 11a of median casing 11 and casing wall 2a, as shown in FIG. 3.

In the Z direction, feeler pin 3 is supported by two parallel ropes 21 which extend between intermediate plate 12 and bottom plate 5c of feeler carrier 5 and are associated with parallel tension springs 22. Two other ropes 23, again associated with parallel tension springs 24, extend between intermediate plate 12 and bottom wall 6 of casing 2.

If now, for example, feeler head 4 of feeler pin 3 comes to apply against a surface 25 of a workpiece 26 to be measured, feeler pin 3, under a corresponding contact pressure, is displaced in the X direction 7. Simultaneously, a signal is delivered to a system (not shown) for evaluating the measured value and this value is indicated by a digital or analog display. With the displacement in the X direction, ropes 13, 13a and 19 are tensioned in addition, while ropes 19a and tension springs 14, 14a and 20 are subjected to tension. Tension springs 20a remain in rest position. At the end of the measuring operation, upon being disengaged from workpiece 26, feeler pin 3 along with its carrier 5 is retracted in the X direction into its initial position, i.e. the coordinate zero position, by the action of tension springs 14, 14a and 20. In this position, the spring forces are in equilibrium and the ropes are stretched uniformly.

For measuring operations in the Y and Z directions, the movements take place substantially in the same way.

Instead of tension springs as described, compression springs may be provided, only the association with the component parts must then correspondingly be changed, in accordance with the compressive forces.

The ropes or bands may comprise a plurality of individual steel strands, such as 10 or 20, which is favorable to the required elasticity of the ropes in the system.

For moving feeler pin 3 in the Z direction, unilaterally fixed helical springs may be provided instead of the tension or compression springs. The motion then results in a compression of the helical springs and after the measuring operation, the spring expands and brings intermediate plate 12 back into the initial position.

While a specific embodiment of the invention has been shown and described in detail to illustrate the application of the principles of the invention, it will be understood that the invention may be embodied otherwise without departing from such principles.

What is claimed is:

1. A measuring head for measuring equipment, multi-coordinate measuring instruments, and machine tools, comprising:

a casing defining a space, a feeler pin extending into said casing space for movement in three-dimensional directions of X, Y and Z coordinates relative to said casing, said feeler pin adapted to engage an article to move said pin in a measuring direction; a feeler carrier connected to said feeler pin and movable in all directions of motion of the X, Y and Z coordinate system in said casing space, a median casing supported in said casing space by rope elements connected in the X, and Y directions between said feeler carrier and said median casing, said median casing being connected by rope elements extending in the X and Y directions to said casing; an intermediate plate in said space; a rope element extending between said intermediate plate and a bottom of said casing, a rope element extending in the Z direction being connected between said intermediate plate and said feeler carrier; all of said rope elements being connected for moving said pin into a coordinate zero position within said casing space and extending in the X, Y and Z directions and being in equilibrium with each other in a state of rest; and a spring element arranged in parallel to each of said rope elements exerting a biasing force in the direction of the coordinate zero position acting in a direction opposite to the measuring motion of said feeler pin.

2. A measuring head according to claim 1, wherein there are a plurality of rope elements extending in spaced parallel relationship one above the other in the X, Y and Z directions, said spring elements exert their forces in the direction opposite to that of the motion of said feeler pin and are associated with each of said rope elements and extend parallel thereto in the respective X, Y and Z directions, and act on said feeler pin to return it to its coordinate zero position.

3. A measuring head according to claim 1, wherein said rope elements comprise a bundle of thin steel strands.

4. A measuring head according to claim 1, wherein said spring elements comprise tension springs.

5. A measuring head according to claim 1, wherein said spring elements comprise compression springs.

6. A measuring head according to claim 1, wherein said spring elements which extend in the Z direction are unilaterally fixed helical springs.

7. A measuring head according to claim 1, wherein said feeler carrier and said median casing are arranged in spaced relationship and parallel to a longitudinal axis of said casing with said intermediate plate extending in a plane transverse to the longitudinal axis of said casing being located between said feeler carrier and said median casing and the upper portion of said casing space.

8. A measuring head comprising:
a casing having side walls and a bottom wall defining a space having a longitudinal axis extending in a Z direction of an X, Y, Z coordinate system;
an intermediate plate in said space lying in a plane containing an X and a Y coordinate of said X, Y and Z coordinate system, said intermediate plate extending transversely to said longitudinal axis;
a feeler carrier in said space spaced from said intermediate plate;
a feeler pin connected to said feeler carrier and having an end extending out of said space adapted for engagement with an article for causing relative movement between said feeler pin and said casing in any direction of said X, Y and Z coordinate system;
a median casing disposed in said space and spaced away from said intermediate plate and from said feeler carrrier;
a first plurality of parallel taut ropes connected between said feeler carrier and said intermediate casing, said first plurality of taut ropes being spaced apart along said longitudinal axis and extending parallel to one of said X and Y coordinates;
a second plurality of parallel taut ropes connected between said feeler carrier and said median casing, said second plurality of ropes spaced apart along said longitudinal axis and extending in the other of said X and Y coordinates;
at least one third taut rope connected between said median casing and one side wall of said casing, said at least one taut rope extending in one of said X and Y coordinates;
at least one fourth taut rope connected between said median casing and another side wall of said casing, said at least one fourth taut rope extending in the other of said X and Y coordinates;
at least one fifth taut rope extending parallel to said longitudinal axis and connected between said intermediate plate and said feeler carrier;
at least one sixth taut rope connected between said intermediate plate and said bottom wall of said casing and extending parallel to said longitudinal axis; and
a spring element associated with each of said first, second, third, fourth, fifth and sixth taut ropes for biasing the movement of said feeler pin to bring said end of said feeler pin into a zero reference position in said X, Y and Z coordinate system.

9. A measuring head according to claim 8, including at least one seventh taut rope connected between said feeler carrier and one of said side walls of said casing, said seventh taut rope having a spring element associated therewith and extending in one of said X and Y coordinates.

10. A measuring head according to claim 8, wherein said feeler carrier and said median casing are both L-shaped in cross-section on a plane transverse to said longitudinal axis, said feeler carrier and said median casing facing each other with said intermediate plate disposed between said feeler carrier and said median casing.

11. A measuring head according to claim 10, wherein said feeler carrier includes a bottom member, said fifth taut rope connected between said bottom member of said feeler carrier and said intermediate plate.

12. A measuring head according to claim 11, wherein said median casing includes a bottom member spaced along said longitudinal axis from said bottom member of said feeler carrier.

13. A measuring head according to claim 8, wherein each of said taut ropes comprises a bundle of thin steel wires.

14. A measuring head according to claim 8, wherein each of said spring elements comprises a tension spring.

15. A measuring head according to claim 8, wherein each of said spring elements comprises a compression spring.

16. A measuring head according to claim 8, wherein each of said spring elements comprises a helical coil spring.

17. A measuring head according to claim 8, wherein said feeler pin extends along said longitudinal axis and said intermediate plate extends across said longitudinal axis and in substantial central alignment with said longitudinal axis.

* * * * *